United States Patent Office
2,945,033
Patented July 12, 1960

2,945,033

7-TRIAZINYLAMINO-3-PHENYL COUMARINS

Heinrich Häusermann, Basel, Switzerland, assignor to J. R. Geigy A.-G., Basel, Switzerland No Drawing. Filed May 12, 1958, Ser. No. 734,446

Claims priority, application Switzerland May 29, 1957

9 Claims. (Cl. 260—247.5)

The invention concerns new 7-triazinylamino-3-phenyl coumarins, processes for the production thereof and their use for improving the appearance of more or less white carriers in daylight by optically compensating the yellowing by blue fluorescent light.

It has been found that valuable 7-triazinylamino-3-phenyl coumarins are obtained if, in a 2.4.6-trihalogen-1.3.5-triazine, a halogen atom is reacted with a 7-amino-3-phenyl coumarin wherein the phenyl radical can be further substituted non-ionogenically and a further halogen atom is reacted with an inorganic or organic nitrogen base containing hydrogen which can be replaced at a basic nitrogen atom, the reactions being performed in any order desired advantageously in inert organic or in inert organic/aqueous solution or suspension or in the melt and in the presence of acid binding agents, and, in the condensation product obtained possibly replacing the third halogen atom of the cyanuric radical also by the hydroxyl group by means of alkali, or by ether groups by means of alkali alkoxide, phenoxide or phenyl mercaptide or by an amine radical by means of an inorganic or organic nitrogen base having a hydrogen atom which can be replaced at a basic nitrogen atom. The components should be so chosen that the aromatic nuclei contain neither ionogenic substituents such as acid groups, e.g. sulphonic acid or carboxyl groups, nor auxochromes, for example amino and hydroxyl groups, nor chromophores.

The end products according to the present invention correspond to the general Formula I:

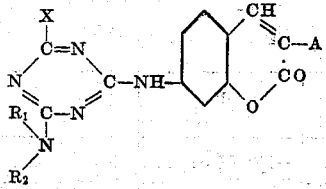

wherein $R_1$ and $R_2$ each represent a member selected from the group consisting of hydrogen, aliphatic, araliphatic, cycloaliphatic, mononuclear aryl and heterocyclic radicals and part of a cycle when taken together.

X represents a member selected from the group consisting of halogen, hydroxyl, alkoxy, mononuclear aryloxy, mononuclear arylmercapto and the radical

in which radical $R_1'$ and $R_2'$ have the same meaning as $R_1$ and $R_2$ above, and A represents an isocyclic-aromatic mononuclear aryl radical, the aromatic nuclei being free from chromophores and ionogenic substituents.

Chiefly the chlorine and bromine compounds are used as 2.4.6-trihalogen-1.3.5-triazine compounds: thus when X represents halogen it is advantageously chlorine or bromine.

The phenyl radical of the 7-amino coumarin compounds used according to the present invention can contain as non-ionogenic substituents, for example aliphatic groups such as methyl, ethyl, isopropyl, tert. butyl, isobutyl, 1.2-tetramethylene groups; alicyclic substituents such as the cyclohexyl group; araliphatic substituents such as the benzyl group; halogens such as fluorine, chlorine or bromine; ether groups such as methoxy, ethoxy, butoxy, benzyloxy or phenoxy groups. However, the unsubstituted or the methyl or chlorine substituted phenyl radical is preferred. The production of such 7-amino-3-phenyl coumarins used according to the present invention is fully described in U.S. Patent No. 2,881,186.

Chiefly ammonia but possibly also hydroxyl amine or hydrazine is used as inorganic nitrogen base which is reacted according to the present invention. Chiefly the aliphatic, cycloaliphatic and hydrogenated heterocyclic primary and secondary amines are used as organic nitrogen bases having a hydrogen atom which can be replaced at a basic nitrogen atom, for example mono- and dialkylamines such as methylamine, ethylamine, butylamine, octylamine, dodecylamine, hexadecylamine, hexadecenylamine, octadecylamine, diethylamine, dibutylamine, dioctylamine, methyldodecylamine, β-hydroxyethylamine, β-hydroxypropylamine, trihydroxy-tertiary butylamine, bis-hydroxyethylamine, cyclohexylamine, dicyclohexylamine, 2-hydroxy-cyclohexylamine; also araliphatic primary and secondary nitrogen bases such as benzylamine, p-methoxybenzylamine, dibenzylamine, hydrogenated heterocyclic amines such as 2-amino-imidazoline, 2-amino-tetrahydropyrimidine, piperidine, morpholine; also mixed aliphatic, araliphatic-aliphatic, alicyclic-aliphatic secondary amines such as, for example N-methyl-, N-ethyl- or N-butyl-ethanolamine, N-benzyl-ethanolamine, N-cyclohexyl-ethanolamine; finally also primary and secondary aromatic amines, advantageously of the benzene series such as aminobenzene, aminomethyl benzenes, aminochlorobenzenes, amino-alkoxybenzene, aminophenol polyglycol ethers, N-alkylaminobenzenes, N-alkylaminoalkyl benzenes, N-alkylamino- methoxybenzenes, -halogenbenzenes, β-hydroxyethoxy-aminobenzenes and amines of the heterocyclic series such as 2-aminopyridine, 5-amino-1.2.4-triazole, 2-aminobenzthiazole.

The replacement of the third halogen atom by hydroxyl can be effected with alkali carbonates or with alkali hydroxides as well as earth alkali hydroxides. Ether groups are introduced advantageously in an excess of the organic hydroxyl or mercapto compound used in the reaction as alkali metal salt. The reaction of the last halogen atom with a primary or secondary organic amine is performed advantageously in an excess thereof, which amine acts as acid binding agent whilst the usual inorganic or organic acid binding agents can be used for the reaction of the first and second halogen atom, such as alkali bicarbonates, alkali carbonates or tertiary nitrogen bases such as triethylamine. If in the first and second reactions, low aliphatic amines are used, then the third halogen can also be reacted with the 7-amino-3-phenyl coumarin in the solution or melt at higher temperatures. For the rest, the conditions usual for such reactions are kept; that is the first halogen atom is reacted at a relatively low temperature, the second at medium temperatures and the third at higher temperatures. The most favourable temperature range is dependent on the reactivity of the amine used for the reaction.

Low ketones such as acetone, methylethyl ketone, dibutyl ketone, cyclohexanone, xylenes, chlorobenzene; ethers such as glycol diethyl ether, dioxan, anisol, phenetol; lower fatty acid amides such as formamide, dimethyl formamide, dimethyl acetamide; also dimethyl sulphoxide can be used as inert organic solvents and diluents. Also on reacting strongly basic amines, also alcohols such as ethanol, isopropanol, butanol, ethylene glycol monomethyl or monoethyl ethers can be used. The 7-triazinylamino-3-phenyl coumarins according to the present invention are colourless to weakly yellow coloured powders having a clear higher melting point. They have a strong green-blue, blue to violet fluorescence in ultraviolet light and in daylight in organic and organic/aqueous solution and are suitable therefore for use as optical brightening agents.

In UV-containing light, for example in daylight, they improve the appearance of more or less colourless or white carriers by optically compensating the yellowing by the blue fluorescent light. For this purpose, they are incorporated in small amounts, e.g. of 0.001 to 1.0%, into the carriers. Because of their hydrophilic properties and often because of their slight water solubility, end products having primary or low secondary amino groups, in particular having low monohydroxy-alkylamino groups at the triazine ring, can be used in aqueous dispersion. For example from a neutral solution of fine washing agents such as alkylaryl sulphonates, fatty alcohol sulphonates or acylamino fatty acids containing higher fatty acid radicals, they draw onto synthetic and natural polypeptide fibres such as synthetic polyamide and polyurethane fibres, wool, silk, also onto cellulose acetate fibres of the mono- to tri-acetate type, onto polyester fibres, some of them also draw well onto cellulose fibres and they very much improve the appearance of the treated material in daylight. The end products according to the present invention having tertiary amino groups at the triazine ring, in particular those having medium to higher hydrocarbon radicals as nitrogen substituents, are suitable for the brightening of many synthetic materials on being incorporated in the mass, for example for the brightening of vinyl polymers such as polyvinyl chloride, polystyrene, polyethylene, polyacryl and polymethacryl acid esters, polyacrylonitrile. They can be incorporated into these substances either in thermoplastic condition or, possibly, in plasticisers. The optical brightening agents according to the present invention are distinguished in polymeric synthetic materials by an extraordinary fastness to light in addition to their good brightening effect. They can be used for the brightening of synthetic detergents, for improving the appearance of lipsticks or creams, of fats, waxes and paraffines.

The following examples illustrate the invention. Where not otherwise stated, parts are given as parts by weight. The temperatures are in degrees centigrade. The relationship of parts by weight to parts by volume is as that of grammes to cubic centimetres.

*Example 1*

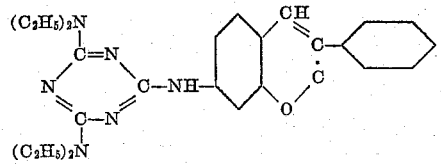

47.4 parts of 7-amino-3-phenyl coumarin are suspended in 500 parts of 2.4-bis-diethylamino-6-chloro-1.3.5-triazine (Am. Soc. 73 2982 (1951)) and the suspension is heated for 1 hour at 160–170° while stirring. A thickly liquid, pale beige paste is obtained. It is cooled, the product is filtered off under strong suction and well washed with benzene. After drying, 90–100 parts of a pale yellowish powder containing halogen are obtained. It is the hydrochloride of the 7-[2.4-bis-diethylamino-1.3.5-triazinylamino-(6)]-3-phenyl coumarin formed. The product can be purified by recrystallisation from dimethyl formamide or alcohol. The pure compound melts on decomposition (splitting off of HCl) at 245–247° and in alcoholic solution it has a strong blue fluorescence. To convert into the free 7-[2.4-bis-diethylamino-1.3.5-triazinylamino-(6)]-3-phenyl coumarin, the hydrochloride is dissolved in hot dimethyl formamide and an excess of aqueous ammonia or sodium acetate solution is added; the product can be isolated by precipitating with water or by evaporating in the vacuum. The free base is a yellowish powder and it crystallises from toluene in pale yellow crystals which melt at 209–210°. In organic solution the new compound fluoresces intensive blue to blue-violet. Both the free base and its hydrochloride are excellently suitable for the brightening of various organic substances, in particular synthetic materials of polymeric character.

0.003 part of the compound obtained according to this example are thoroughly mixed with 100 parts of polystyrene powder and then homogeneously mixed on a set of mixing rollers at 130°. The hard plate obtained is broken up and the product is further worked up by injection moulding or by presses. The synthetic product obtained has a considerably more white appearance in daylight than a comparative product produced under analogous conditions but without the brightening agent. An opaque product is obtained by working up 0.015 part of brightening agent, 100 parts of polystyrene powder and 2 parts of titanium dioxide (Anatas) in the manner described above. The opaque product also has a considerably more white appearance than the corresponding product without the addition of brightening agent.

100 parts of high pressure polyethylene in the form of granulate are mixed dry at room temperature with 0.05 part of 7-[2.4-bis-diethylamino-1.3.5-triazinylamino-(6)]-3-phenyl coumarin and the mixture is then worked up in an extruder at 120–130° into a tube. The tube obtained is considerably more white than the product produced without brightening agent. The brightening effect of the new coumarin compound can also be seen with opaque polyethylene. An opaque plate is produced for example by pressing 100 parts of granulated polyethylene, 0.1 part of brightening agent and 2 parts of Anatas at 120–130°.

The following compounds can be used in an analogous manner for brightening the above synthetic materials:

TABLE

General formula:

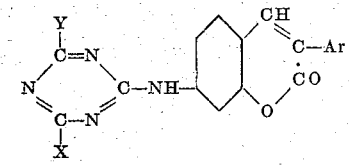

| X | Y | Ar | M.P., degrees |
|---|---|---|---|
| —N($C_3H_7$)$_2$ | —N($C_3H_7$)$_2$ | phenyl- | 164–165 |
| —N(n—$C_4H_9$)$_2$ | —N(n—$C_4H_9$)$_2$ | -phenyl | 148–149 |
| —N($C_2H_5$)$_2$ | —N($C_2H_5$)$_2$ | m-methylphenyl- | 158–160 |
| —N($C_2H_5$)$_2$ | —N($C_2H_5$)$_2$ | o-chlorophenyl- | 161–162 |
| —N($C_2H_5$)$_2$ | —N($C_2H_5$)$_2$ | 2.4-dimethylphenyl- | 197–198 |
| —N($C_2H_5$)$_2$ | —N($C_2H_5$)$_2$ | o-methylphenyl- | 185–186 |

All the above compounds can be produced by the method described in this example. Those products having an o-substituent at the radical Ar (methyl or chlorine) are almost colourless and in organic solution have a fluorescent colour shifted towards shorter wave length. In a solid condition, the other derivatives are more or less strongly yellow coloured.

*Example 2*

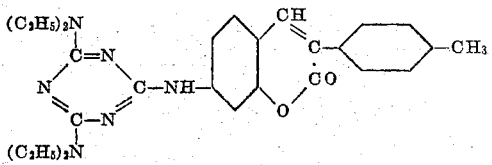

25.1 parts of 7-amino-3-(p-methylphenyl)coumarin and 50 parts of 2.4-bis-diethylamino-6-chloro-1.3.5-triazine (Am. Soc. 73 2982 (1951)) are boiled under reflux for 6 hours in 250 parts of dimethyl formamide while stirring. The clear, brownish reaction solution is diluted with 250 parts of alcohol and on the addition of excess concentrated hydrochloric acid, the hydrochloride of 7-[2.4-bis-diethylamino-1.3.5-triazinylamino-(6)]-3-(p-methylphenyl)-coumarin separates in the form of an almost colourless precipitate. 40–45 parts of the crude chlorohydrate are obtained. It can be obtained in analytically pure form by recrystallising from dimethyl formamide (M.P. 255–260° while splitting off HCl). In alcoholic solution, this product also has a splendid blue fluorescence. To produce the free base, the hydrochloride is suspended in about 10 times the amount of dimethyl formamide and a concentrated aqueous solution of sodium acetate (150–200 parts of crystallised sodium acetate to 510 parts of hydrochloride) is added at water bath temperature. The product can be isolated either by precipitating with water or by distilling off the dimethyl formamide/water mixture. The compound recrystallised from toluene or benzene forms yellowish crystals which melt at 185–186°. The new coumarin derivative dissolves in many organic solvents with a greenish-blue to blue-violet fluorescence. The compound is also excellently suitable for the brightening of organic substances.

If in this example the 25.1 parts of 7-amino-3-(p-methylphenyl)-coumarin is replaced by 27.2 parts of 7-amino-3-(p-chlorophenyl)-coumarin, then 7-[2.4-bis-diethylamino - 1.3.5 - triazinylamino - (6)]-3-(p-chlorophenyl)-coumarin is obtained in an analogous manner. M.P. 198–199°. This product containing chlorine also has fluorescent properties analogous to the p-tolyl derivative and is also suitable for the brightening of organic materials.

0.004 part of the 7-[2.4-bisdiethylamino-1.3.5-triazinylamino-(6)]-3-(p-methylphenyl)-coumarin obtained are dissolved in 100 parts of monomeric methacrylic acid methyl ester, 0.1 part of lauroyl peroxide are added and the whole is poured into the desired form. The mixture is polymerised by heating for 24 hours at 60° and then tempered for 1 hour at 160°. Due to its vivid blue fluorescence in daylight, the glass clear resinous body obtained has a more brilliant appearance than a synthetic resin produced without the addition of the brightening agent.

0.01 part of 7-[2.4-bis-diethylamino-1.3.5-triazinylamino-(6)]-3-(p-chlorophenyl)-coumarin and 0.1 part of benzoyl peroxide are dissolved in 100 parts of a monomeric unsaturated ester of the marketed name "Palatal 5." The solution is poured between glass plates and polymerised for 1 hour at 80°. A polyester resin which fluoresces blue-violet in ultra-violet light is obtained which has a more brilliant aspect in daylight than a resin plate produced without the addition of brightening agent. This unsaturated polyester resin can also be produced by polymerising cold for several hours. In this case too, the brightening agent has a good effect.

In addition to the two compounds mentioned in this example naturally also the products as described for example in Example 1 can be used for the treatment of these resins.

*Example 3*

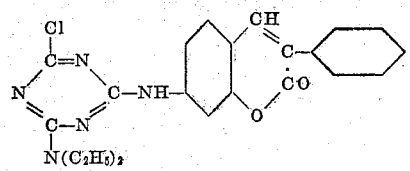

18.45 parts of cyanuric chloride are dissolved in 1000 parts by volume of acetone and 500 parts of broken up ice are added while stirring. An acetone solution of 23.7 parts of 7-amino-3-phenyl coumarin is poured within about 10 minutes to the mixture so obtained while cooling with ice and stirring and the hydrochloric acid liberated is neutralised by the dropwise addition of 15% aqueous sodium carbonate solution. After the addition of the amine, the pale yellowish suspension is stirred at 0–5° while the reaction is kept neutral with sodium carbonate solution until a sample reacted with nitrous acid shows that there is no more diazonium compound present. The reaction is completed after 2–3 hours. In this way 7 - [2.4 - dichloro - 1.3.5 - triazinylamino-(6)]-3-phenyl coumarin is obtained as a yellowish suspension. The dichloro-derivative is then reacted with diethylamine without being isolated as follows:

An about 50% aqueous solution of 15.5 parts of diethylamine is added at 0–10° while stirring within 30 minutes and the mixture obtained is then stirred overnight at room temperature. On completion of the reaction, the reaction mixture is heated for 1 hour at 50–60°, then cooled to 0–10° and the yellowish precipitate is filtered off. After washing with water and drying in the vacuum at 70–80°, 35–40 parts of a yellowish, halogen-containing powder are obtained. On recrystallising from toluene, the 7-[2-diethylamino-4-chloro-1.3.5-triazinylamino-(6)]-3-phenyl coumarin can be obtained in an analytically pure form. The purified product is a yellow crystal powder which melts at 199–200°. In alcoholic solution the new compound has a strong blue fluorescence, in benzene or acetone solution it has a strong blue-violet fluorescence. Because of its good fluorescence properties, favourable solubility in organic substances and relatively good stability to light, the new compound is suitable for not only the optical brightening of synthetic materials such as, e.g. vinyl and vinylidene polymers, polystyrenes, polyethylenes but also for the brightening of certain synthetic textile fibres. For example, if Dacron fabric of yellowish appearance is treated with 0.025–0.1% of this triazinyl derivative then the fabric has a much better appearance in daylight than the untreated fabric.

If in this example the cyanuric chloride is replaced by cyanuric bromide then 7-[2-diethylamino-4-bromo-1.3.5-triazinylamino-(6)]-3-phenyl coumarin is obtained in an analogous manner. Also if the 23.7 parts of 7-amino-3-phenyl coumarin are replaced by 25.1 parts of 7-amino-3-(m-methylphenyl)-coumarin (M.P. 227–228°) then 7 - [2 - diethylamino - 4 - chloro - 1.3.5 - triazinylamino-(6)]-3-(m-methylphenyl)-coumarin which melts at 187–188° is obtained in an analogous manner. This product also has a strong fluorescence in inorganic solution and is suitable for the brightening of organic materials.

If in this example the 15.5 parts of diethylamine are replaced by 21 parts of dipropylamine or 27 parts of dibutylamine, then 7-[2-dipropylamino-4-chloro-1.3.5-triazinylamino-(6)]-3-phenyl coumarin (M.P. 183–184°) or 7-[2-dibutylamino-4-chloro-1.3.5-triazinylamino-(6)]-3-phenyl coumarin (M.P. 139–140°) are obtained respectively. They can also be used for brightening of organic materials.

10 parts of a polyester fabric of the trade name "Dacron" having a yellowish appearance are treated for 30 minutes at 95–100° in a bath (liquor ratio 1:50) containing 0.005 part of 7-[[2-diethylamino-4-chloro-1.3.5-triazinylamino-(6)]-3-phenyl coumarin as well as 0.25 part of an olein alcohol pentadecyl glycol ether. The fabric is then rinsed and dried. In daylight it has a considerably more white appearance than the corresponding untreated fabric.

The same brightening effect can be attained by the 7-[2 - diethylamino - 4 - chloro - 1.3.5 - triazinylamino - (6)]-3-(m-methylphenyl)-coumarin also mentioned in this example. Also 7-[2-diethylamino-4-chloro-1.3.5-triazinylamino-(6)]-3-(o-chlorophenyl)-coumarin (colourless crystals, M.P. 207–208°) produced in an analogous manner produces a good brightening effect on polyester fibres. The latter compound has a clearly more violet fluorescence than the first named blue fluorescent products.

Also synthetic materials can be brightened with the above triazinyl derivatives according to the application methods described in Examples 1, 2 and 5.

*Example 4*

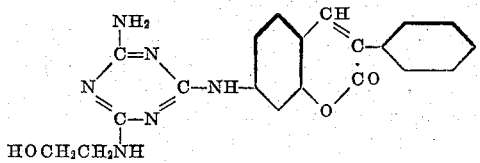

23.7 parts of 7-amino-3-phenyl coumarin are reacted as described in Example 3 with 18.45 parts of cyanuric chloride and the 7-[2.4-dichloro-1.3.5-triazinylamino-(6)]-3-phenyl coumarin obtained is isolated by filtering off under suction, washing with water and acetone and drying. The dichlorotriazinyl derivative is fairly difficult to dissolve in organic solvents and it melts at 350° while becoming darker in colour.

77 parts of this dichloro-derivative are suspended in 750 parts by volume of ethylene glycol monomethyl ether and concentrated aqueous ammonia solution is added dropwise at 0–10° until phenolphthalein paper turns red. The mixture is heated while stirring at 70–75° and stirred for an hour at this temperature while maintaining the alkalinity by the dropwise addition of further amounts of ammonia solution. A pale yellowish, viscous suspension of the 7-[2-amino-4-chloro-1.3.5-triazinyl-(6)-amino]-3-phenyl coumarin formed is obtained. After cooling, this intermediate product is filtered off under suction, washed with alcohol and water and dried. The intermediate product dissolves in hot dimethyl formamide with a strong blue fluorescence and it melts at over 330° on decomposition. To react with monoethanolamine, the monochlorotriazinyl derivative is heated in 500 parts of dimethyl formamide with 50 parts of monoethanolamine for 30 minutes at 120–130° while stirring. A brownish solution which fluoresces strong blue is obtained which also remains clear on cooling to room temperature. The reaction product formed is isolated by distilling off the greater part of the solvent under reduced pressure and adding about 1000 parts of water to the residue. The pale yellow precipitate is filtered off, washed with water and crystallised from diluted methyl cellosolve. The 7-[2 - amino - 4 - hydroxyethylamino - 1.3.5 - triazinylamino-(6)]-3-phenyl coumarin obtained melts at 220–221° and it is a yellowish powder which has an intensive blue fluorescence in alcoholic solution. Because of its affinity to various substrata, this product is an excellent brightening agent for various textile fibres. For example cotton, wool, polyamide fibres, polyacrylonitrile fibres and cellulose acetate fibres can be brightened therewith.

A product having a similar effect is obtained if in this example the monoethanolamine is replaced by excess diethanolamine. The 7-[2-amino-4-diethanolamino-1.3.5-triazinylamino-(6)]-3-phenyl coumarin so obtained crystallises from methyl cellosolve/alcohol in coarse yellow prisms which melt at 222–224°.

10 parts of polyacrylonitrile fabric of the trade name "Orlon" having a yellowish appearance are treated for 30 minutes at 95–100° in a bath (liquor ratio 1:50) containing 0.01 part of 7-[2-amino-4-hydroxyethylamino-1.3.5-triazinylamino-(6)]-3-phenyl coumarin and 0.5 part of formic acid. After rinsing and drying, the material so treated has a considerably more white appearance than untreated material.

100 parts of white woollen knitten goods are washed for 30 minutes at 50–55° in 1000 parts of a washing liquor containing 2.5 parts of an alkylaryl sulphonate and 0.05 part of the 7-[2-amino-4-hydroxyethylamino-1.3.5-triazinylamino-(6)]-3-phenyl coumarin described above, and then rinsed and dried in the air. Wool of a considerably more white appearance is obtained than if the woollen goods had been washed without the addition of the brightening agent named.

25 parts of previously bleached wool flannel having a yellowish appearance are treated for 30 minutes at 50–55° in a dye-bath (liquor ratio 1:30) containing 0.05 part of 7-[2-amino-4-diethanolamino-1.3.5-triazinylamino-(6)]-3-phenyl coumarin and 0.5 part of formic acid and the goods are rinsed and dried. The wool so treated has a considerably higher degree of whiteness than the untreated wool.

The following six compounds which can be produced in an analogous manner from the corresponding starting materials, also have a good brightening effect on the textiles mentioned:

7 - [2 - amino - 4 - diethylamino - 1.3.5 - triazinylamino - (6)]-3-phenyl coumarin yellowish powder, M.P. 211–212°;

7 - [2 - amino - 4 - hydroxyethylamino - 1.3.5 - triazinylamino-(6)]-3-(m-methylphenyl)-coumarin, yellowish powder, M.P. 204–206°;

7 - [2 - amino - 4 - hydroxyethylamino - 1.3.5 - triazinylamino-(6)]-3-(o-chlorophenyl)-coumarin, almost colourless powder, M.P. 196–198°;

7 - [2 - amino - 4 - methylamino - 1.3.5 - triazinylamino - (6)]-3-phenyl coumarin, yellow powder, M.P. 280–282°;

7 - [2 - amino - 4 - propylamino - 1.3.5 - triazinylamino - (6)]-3-phenyl coumarin, yellowish powder, M.P. 190–191°;

7 - [2 - amino - 4 - morpholino - 1.3.5 - triazinylamino - (6)]-3-phenyl coumarin, yellowish powder, M.P. 286–287°.

Both in solution and on the fibre, the o-chlorophenyl derivative has a more clearly violet fluorescence than the other products mentioned in this example.

*Example 5*

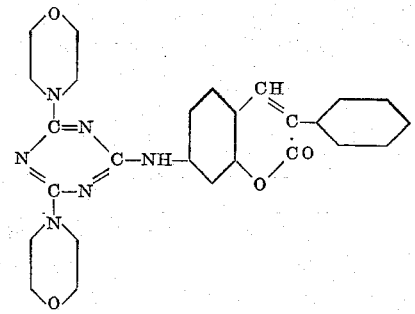

77 parts of 7-[2.4-dichloro-1.3.5-triazinylamino-(6)]-3-phenyl coumarin obtained according to Example 3 are suspended in 750 parts of methyl Cellosolve and morpholine is added dropwise at 20–30° while stirring until a sample dropped onto damp phenolphthalein paper clearly turns red. The yellowish suspension is heated while stirring to 110–115° and stirred for 30 minutes at this temperature while maintaining the alkaline reaction by successive additions of morpholine. The yellow crystal paste is then allowed to cool and the 7-[2.4-dimorpholino-1.3.5-triazinylamino-(6)]-3-phenyl coumarin formed is filtered off under suction. The product is purified by washing with alcohol and recrystallising from about 25 times the amount of chlorobenzene. The new coumarin derivative, a yellow crystal powder which melts at 275–276°, has a vivid blue to blue-violet fluorescence in acetone or ethyl acetate and is excellently suitable for the brightening of various polymeric synthetic materials.

A product which is also a valuable brightening agent for polymeric synthetic materials is obtained if in this example the morpholine is replaced by excess N-ethylbutylamine. The 7-[2.4-bis-(N-ethylbutylamino)-1.3.5- triazinylamino-(6)]-3-phenyl coumarin so obtained forms pale yellow fine crystals which melt at 127–129°. In alcoholic solution, the product has a blue and in benzene solution it has a blue-violet fluorescence. It has the advantage over the morpholine derivative that it has much better solubility in organic solvents and plasticising agents.

0.07 part of 7-[2.4-dimorpholino-1.3.5-triazinylamino-(6)]-3-phenyl coumarin are gelatinised on a set of mixing rollers at 160° for 15 minutes with a mixture consisting of 67 parts of polyvinyl chloride powder, 33 parts of dioctyl phthalate, 2 parts of di-n-butoxy tin dilaurate and 0.3 parts of sodium penta-octyl tripolyphosphate and then drawn out into foils. The polyvinyl chloride foils produced in this way have a considerably more white appearance in daylight than the corresponding foils produced without the addition of this brightening agent.

0.05 part of 7-[2.4-bis-(N-ethylbutylamino)-1.3.5-triazinylamino-(6)]-3-phenyl coumarin, 7 parts of titanium dioxide (Anatas), 67 parts of polyvinyl chloride, 33 parts of dioctyl phthalate, 2 parts of dibutyl tin dilaurate and 0.03 parts of sodium penta-octyl tripolyphosphate are worked up in the manner described above into an opaque foil. The foil so produced has a much whiter appearance than a comparative sample produced without brightening agent.

In the same way, for example, also the compounds listed in the following table can be used for the brightening of polyvinyl products:

tained becomes thinly liquid. It is then slowly heated to room temperature and stirred over night at this temperature. To complete the reaction, the yellow suspension is boiled under reflux at 100–110° for 2–3 hours while stirring. The reaction product is isolated in the usual way by evaporating under reduced pressure or precipitating with water, washed with water and purified by recrystallising from ethylene glycol monomethyl ether, ethyl alcohol or dimethyl formamide/ethyl alcohol. The 7 - [2.4 - diethylamino - 1.3.5 - triazinylamino - (6)] - 3-phenyl coumarin obtained forms a finely crystalline powder which melts at 264–265°. The new compound, which has a vivid blue fluorescence in alcoholic solution, can be used for the brightening of acetate silk and polyamide fibres.

The same product is obtained if 23.7 parts of 7-amino-3-phenyl coumarin are reacted according to the process described in Example 2 with excess (30 parts) of 2.4-bis-ethylamino-6-chloro-1.3.5-triazine ((Thurston, Am. Soc. 73, 2982 (1951)) in 250 parts of dimethyl formamide or dimethyl sulphoxide.

10 parts of pale yellowish nylon fabric are treated for 30 minutes at 70° in a dyebath (liquor ratio 1:40) which contains 0.01 part of 7-[2.4-diethylamino-1.3.5-triazinyl-amino-(6)]-3-phenyl coumarin and 0.2 part of formic acid. After rinsing and drying, the material so treated has a much more white appearance than before treatment.

10 parts of undyed acetate silk yarn are treated at 75°

TABLE

General formula:

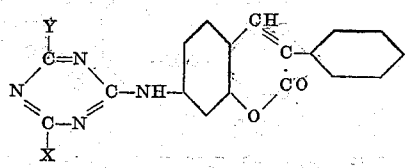

| X | Y | Appearance | M.P., degrees |
|---|---|---|---|
| —N(CH₃)₂ | —N(CH₃)₂ | pale yellow crystals | 238–239 |
| —NH—⟨H⟩ | —NH—⟨H⟩ | yellow powder | 217–218 |
| —NH—⟨⟩ | —NH—⟨⟩ | greenish yellow powder | 276–277 |
| piperidino | piperidino | yellow crystals | 235–236 |
| —NHC₂H₄N(CH₃)₂ | —N(C₂H₅)₂ | yellow powder | 68–70 |
| —NHC₁₂H₂₅ | —NHC₁₂H₂₅ | pale yellow powder | 143–145 |
| —NHC₁₈H₃₇ | —N(C₂H₅)₂ | do | 99–100 |
| —NH—CH₂—⟨⟩ | —N(C₂H₅)₂ | yellowish crystals | 167–168 |

The compounds listed in this table can be produced by the method described in this example or in Example 7.

*Example 6*

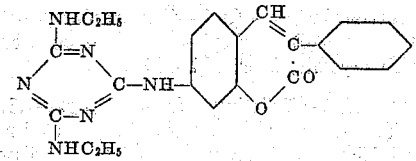

77 parts of the 7-[2.4-dichlorotriazinylamino-(6)]-3-phenyl coumarin obtained according to Example 3 are suspended in 500 parts of dimethyl formamide and at 0–10° 60 parts of a 70% aqueous ethylamine solution are added while stirring. The thickly liquid paste obin a bath (liquor ratio 1:30) containing 0.0025 part of the triazinyl compound mentioned above. After rinsing and drying, the yarn so treated has a much more white appearance than before treatment.

100 parts of undyed nylon material are washed at 70° in a washing liquor (liquor ratio 1:10) containing 0.05 parts of the brightening agent described above and 8 g./litre of a synthetic washing agent, for 30 minutes, and then rinsed and dried. The fabric so treated has a much more brilliant appearance than a fabric washed without the addition of the brightening agent.

The compounds listed in the following table which can all be produced by the method described in this example, can be used in an analogous manner for example for the brightening of polyamide and acetyl cellulose fibres.

TABLE

General formula:

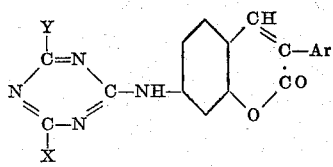

| X | Ar | Appearance | M.P., degrees |
|---|---|---|---|
| —NHC$_4$H$_9$ | phenyl | yellowish crystals | 145–147 |
| —NHC$_2$H$_5$ | p-methylphenyl | do | 259–261 |
| —NHC$_2$H$_5$ | p-chlorophenyl | yellow powder | 288–289 |
| —NHCH$_2$CH$_2$OH | phenyl | do | 263–265 |
| —NCH$_2$CH$_2$OH<br>\|<br>CH$_3$ | do | do | 182 |
| —NCH$_2$CH$_2$OH<br>\|<br>C$_2$H$_5$ | do | pale yellow powder | 156–157 |
| —N(CH$_2$CH$_2$OH)$_2$ | do | pale yellowish needles | 227–228 |
| —NHCH$_2$CH$_2$OH | m-methylphenyl | yellow powder | 211–213 |
| —NCH$_2$CH$_2$OH<br>\|<br>CH$_3$ | m-methylphenyl | do | 164–166 |
| —N(CH$_2$CH$_2$OH)$_2$ | do | yellowish powder | 215–215 |

Example 7

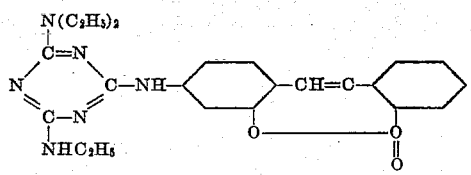

8.43 parts of 7-[2-diethylamino-4-chloro-1.3.5-triazinylamino-(6)]-3-phenyl coumarin obtained according to Example 3 are suspended in 75 parts of ethylene glycol monomethyl ether and 2.5 parts of 70% aqueous ethylamine solution are added. The mixture obtained is boiled under reflux for 30 minutes while stirring and the 7-[2-diethylamino-4-ethylamino - 1.3.5 - triazinylamino-(6)]-3-phenyl coumarin is isolated by precipitating from the clear, strongly blue-fluorescing solution with water. On recrystallising from hot toluene the analytically pure product is obtained as pale yellow little crystals which melt at 171–172°.

The compound is suitable among other things for the optical brightening of cellulose di- and tri-acetate products.

10 parts of undyed, pale yellowish cellulose triacetate fabric are treated for 30 minutes at 95–100° in a dyebath (liquor ratio 1:50) containing 0.02 part of 7-[2-diethylamino-4-ethylamino-1.3.5-triazinylamino - (6)]-3-phenyl coumarin. After rinsing and drying, the triacetate fabric has a considerably more white appearance than before treatment.

Also the following optical brightening agents for example, which are produced according to the method described in this example, can be used for the optical brightening of cellulose triacetate substances:

7-[2-diethylamino-4-hydroxyethylamino - 1.3.5-triazinylamino-(6)]-3-phenyl coumarin, yellow powder, M.P. 192–194°,
7-[2-diethylamino - 4 - diethanolamino - 1.3.5-triazinylamino-(6)]-3-phenyl coumarin, yellow powder, M.P. 128° (as monohydrate), M.P. of the anhydrous substance: 178–179°.

Example 8

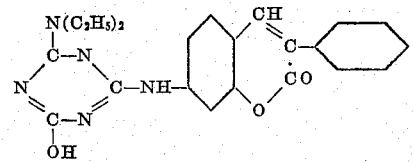

8.43 parts of 7-[2-diethylamino-4-chloro-1.3.5-triazinylamino-(6)]-3-phenyl coumarin are boiled under reflux in 160 parts of glacial acetic acid for 20 hours. The chlorotriazine derivative gradually dissolves and towards the end the 7-[2-diethylamino-4-hydroxy-1.3.5-triazinylamino-(6)]-3-phenyl coumarin begins to form as a pale yellow precipitate. After cooling, the product is filtered off, washed with alcohol and purified by recrystallising from dimethyl formamide/alcohol. The pure compound is an only pale yellowish coloured crystal powder which melts at 315–316°. The new coumarin derivative does not dissolve in organic solvents as well as the corresponding chloro-derivative.

If in this example the 7-[2-diethylamino-4-chloro-1.3.5-triazinylamino-(6)]-3-phenyl coumarin is replaced by 2-amino-o-methylphenylamino compound then 7-[2-(o-methylphenylamino)-4 - hydroxy - 1.3.5-triazinylamino-(6)]-3-phenyl coumarin (M.P. 340°) is obtained as a pale yellowish powder. Both the above products can be used according to Example 5 for brightening polyvinyl chloride products.

Example 9

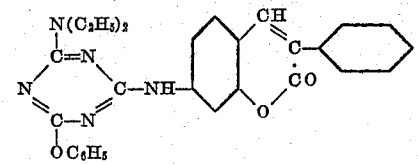

8.43 parts of 7-[2-diethylamino-4-chloro-1.3.5-triazinylamino-(6)]-3-phenyl coumarin are added to a solution of 4 parts of phenol and 0.46 part of sodium in 85 parts by volume of n-butyl alcohol and the whole is boiled under reflux for 2 hours while stirring. After distilling off the butanol, the residue is washed with water and a little alcohol and it can be purified by recrystallising from toluene. 7-[2-diethylamino - 4 - phenoxy-1.3.5-triazinylamino-(6)]-3-phenyl coumarin is obtained as a pale yellowish powder which melts at 196–198°. The new compound fluoresces in organic solution blue to blue-violet depending on the type of solvent and it can be used for the brightening of organic substances.

If in this example the phenol is replaced by 4.2 parts of thiophenol, then 7-[2-diethylamino-4-phenylmercapto-1.3.5-triazinyl(6)-amino]-3-phenyl coumarin (M.P. 168–169°) is obtained as pale yellow crystals.

The following valuable phenol or thiophenol derivatives can be produced in an analogous manner:

7-[2-diethylamino-4-(p-methylphenoxy) - 1.3.5-triazinyl-(6)-amino]-3-phenyl coumarin, pale yellowish crystals, M.P. 189–191°, 7-[2-diethylamino-4-(p-chlorophenoxy) - 1.3.5-triazinyl-(6)-amino]-3-phenyl coumarin, pale greenish yellow needles, M.P. 213–214°, 7-[2 - diethylamino - 4 - (3.4 - dichlorophenylmercapto)-1.3.5-triazinyl-(6) - amino] - 3 - phenyl coumarin, pale yellowish crystals, M.P. 192–193°.

0.2 part of 7-[2-diethylamino-4-phenoxy-1.3.5-triazinylamino-(6)]-3-phenyl coumarin, 75 parts of acetylcellulose and 25 parts of diethyl phthalate are dissolved in 900 parts of acetone. The solution obtained is poured onto glass plates and, after evaporating off the acetone, transparent films which can be drawn off the glass plates are obtained. In daylight these plates have a more brilliant appearance than corresponding films produced without the addition of the brightening agent named.

Opaque cellulose acetate films are produced by adding 5 parts of Anatas to the above mixture before pouring it onto the glass plates. The opaque films obtained are much whiter than those produced without the addition of the brightening agent. The compounds mentioned in this example can be used with the same success for brightening other synthetic materials such as, e.g. polyvinyl chloride foils.

Naturally also other compounds according to the invention, for example the products mentioned in Example 5 can be used for the brightening of such cellulose acetate products in the same manner.

Example 10

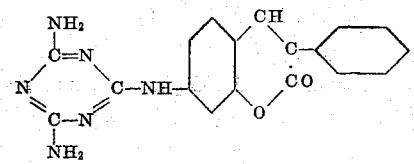

38.5 parts of 7-[2.4-dichloro-1.3.5-triazinylamino-(6)]-3-phenyl coumarin obtained according to Example 3 are suspended in 500 parts of ethylene glycol monomethyl ether and ammonia in gas form is introduced at 20–30° until a sample dropped onto damp phenolphthalein paper shows a clear reddening. The whole is heated to 120–130° while maintaining this alkalinity by the introduction of further amounts of ammonia, and is stirred for 10 hours at this temperature the alkalinity being maintained as described above. After cooling, the pale yellowish coloured precipitate is filtered off, washed with alcohol and water and dried at 80°. The 7-[2.4-diamino-1.3.5-triazinylamino-(6)]-3-phenyl coumarin so obtained dissolves in dimethyl formamide or methyl cellosolve with a strong blue fluorescence. The product crystallises from dimethyl formamide-alcohol in pale yellowish fine aggregates which melt at 311–312°. The new compound can be used for example for the brightening of cellulose fibres.

0.001 part of 7-[2.4-diamino-1.3.5-triazinylamino-(6)]-3-phenyl coumarin are dissolved in 1 part of hot dimethyl formamide or ethylene glycol monomethyl ether and the solution is poured at 70–80° into 400 parts of water. 10 parts of white cotton poplin are treated for 15 minutes at 70–80° with the blue fluorescent dispersion so obtained. After rinsing and drying the cotton so treated has a much more white appearance in daylight than before treatment.

Example 11

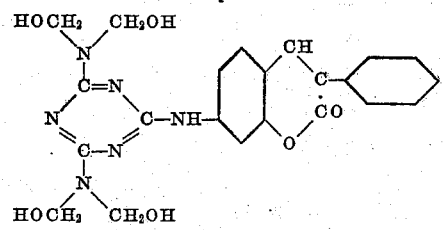

3.46 parts of 7-[2.4-diamino-1.3.5-triazinylamino-(6)]-3-phenyl coumarin obtained according to Example 10 are added while stirring to 30 parts of 37% aqueous formaldehyde solution, 4 parts of sodium carbonate are added and the whole is stirred for 10 hours at 60–65°. After cooling, unchanged starting material is filtered off and the reaction product corresponding roughly to the above formula is isolated by evaporating in the vacuum or by precipitating from the yellow filtrate with water. The methylol compound obtained is a yellow powder, the softening point of which is 150°. The compound is more easily soluble in solvents containing hydroxyl groups such as, e.g. ethylene glycol monomethyl ether, as the diamino compound not reacted with formaldehyde and like that compound, it can be used for the brightening of cellulose fibres.

Example 12

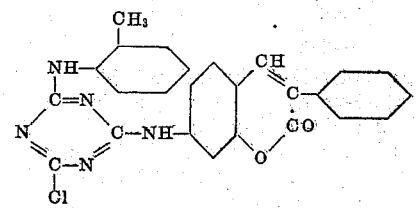

77 parts of 3-phenyl-7-[2.4-dichloro-1.3.5-triazinylamino-(6)]-coumarin obtained according to Example 3 are well distributed while stirring in a mixture of 960 parts of acetone and 40 parts of water and 21.4 parts of o-toluidine and 22 parts of sodium carbonate are added one after the other at 20–30°. The yellowish suspension is stirred for 24 hours at room temperature, after which time the toluidine has practically disappeared. 500 parts of water are added while stirring to the reaction mixture which is a thinly liquid pale yellowish coloured suspension, the yellowish precipitate is filtered off, washed with water and dried in the vacuum at 60°. The 3-phenyl-7-[2-chloro-4-(o-methylphenylamino)-1.3.5-triazinylamino-(6)]-coumarin obtained crystallises from dimethyl formamide/alcohol in yellowish crystals which melt at 242° on decomposition. This compound also can be used for the brightening of substrata such as, e.g. synthetic polyamide fibres. The diluted alcoholic solution of the compound has a strong blue fluorescence.

10 parts of yellowish nylon fabric are treated for 15 minutes at 75° in a dyebath (liquor ratio 1:50) which contains 0.005 part of the triazine derivative named above as well as 0.25 part of a condensation product from olein alcohol and 15 mols of ethylene oxide. After rinsing and drying the material so treated has a much more white appearance than before treatment.

The compounds listed in the following table can also be used for example for the brightening of polyamide fibres in the same manner:

TABLE

General formula:

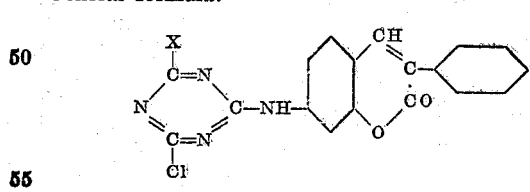

| X | appearance | M.P. |
|---|---|---|
| m-methoxyanilino | yellowish crystals | 209–211°. |
| m-chloranilino | do | 227–228° on decomposition. |
| p-chloraniline | pale yellow powder | 270–273° on decomposition. |
| o-ethoxyanilino | do | 210–212°. |
| 2-hydroxy-cyclohexyl-amino | pale yellow crystals | 175–178°. |
| β-phenylethylamino | yellow crystals | 183–185°. |
| monoethanolamino | yellow powder | 230–232°. |
| diethanolamino | pale yellow prisms | 225–227° on decomposition. |
| ethylamino | pale yellow crystals | 248–250°. |
| thiazolyl-(2)-amino | yellow powder | over 300° on decomposition. |
| 4.5-dihydro-imidazolyl-(2)-amino | do | over 365° on decomposition. |
| pyridyl-(2)-amino | do | decomposes over 330°. |
| tetrazolyl-(5)-amino | do | decomposes over 365°. |
| 1.2.4-triazolyl-(3)-amino | do | decomposes over 365°. |

Example 13

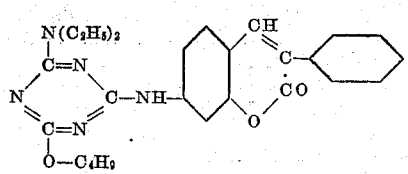

42.2 parts of 7-[2-diethylamino-4-chloro-1.3.5-triazinyl-amino-(6)]-3-phenyl coumarin obtained according to Example 3 are boiled under reflux while stirring in a solution of 2.3 parts of sodium in 300 parts by volume of n-butyl alcohol for 1 hour. The precipitated sodium chloride is filtered off, the solution obtained is evaporated to dryness in the vacuum at water bath temperature and the residue is recrystallised from benzene/petroleum ether. The 7-[2-diethylamino-4-butoxy-1.3.5-triazinyl-amino-(6)]-3-phenyl coumarin which crystallises into yellowish coloured prisms melts at 158–160° and, in benzene solution, has a vivid blue-violet fluorescence.

If in this example, the n-butyl alcohol is replaced by n-propyl alcohol, then 7-[2-diethylamino-4-propoxy-1.3.5-triazinylamino-(6)]-3-phenyl coumarin is obtained in an analogous manner. It melts at 181° and has the same fluorescent properties.

Both these triazine derivatives can be used for the brightening of polyvinyl chloride synthetic materials according to Example 5.

What I claim is:

1. 7-triazinylamino-3-phenyl coumarins of the formula

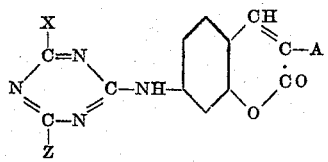

wherein X stands for a member selected from the group consisting of amino, alkylamino, lower dialkylamino, cyclohexylamino, monoethanolamino, diethanolamino, N-phenylamino, morpholino, piperidino, Cl, Br, hydroxy, lower alkoxy, phenoxy, lower alkylphenoxy, chlorophenoxy, phenylthio, chlorophenylthio, hydroxycyclohexylamino, lower alkylaminoalkylamino, N-lower alkylphenylamino, N-lower alkoxyphenylamino, N-chlorophenylamino, benzylamino, N-pyridylamino, N-thiazolylamino, N-dihydro-imidazolylamino, N-triazolylamino and N-tetrazolylamino, Z stands for a member selected from the group consisting of amino, alkylamino, lower dialkylamino, cyclohexylamino, monoethanolamino, diethanolamino, N-phenylamino, morpholino and piperidino, and A represents a member selected from the group consisting of phenyl, chlorophenyl, methylphenyl and dimethylphenyl.

2. The 7-triazinylamino-3-phenyl coumarin of the formula:

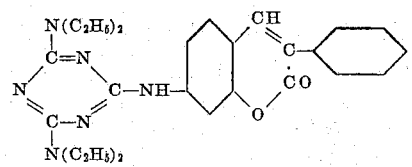

3. The 7-triazinylamino-3-phenyl coumarin of the formula:

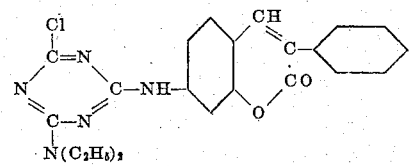

4. The 7-triazinylamino-3-phenyl coumarin of the formula:

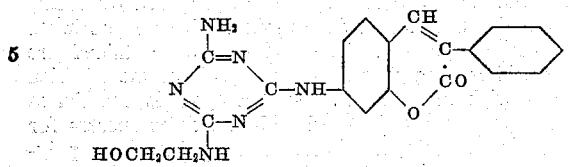

5. The 7-triazinylamino-3-phenyl coumarin of the formula:

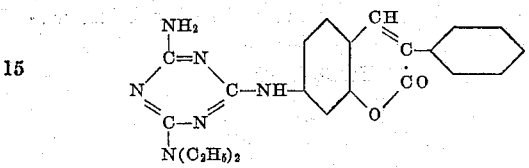

6. The 7-triazinylamino-3-phenyl coumarin of the formula:

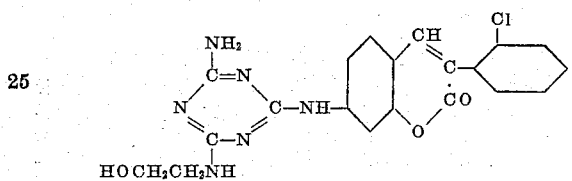

7. The 7-triazinylamino-3-phenyl coumarin of the formula:

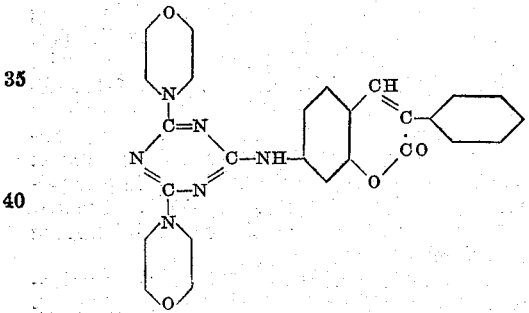

8. The 7-triazinylamino-3-phenyl coumarin of the formula:

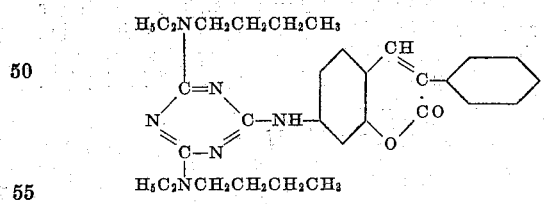

9. The 7-triazinylamino-3-phenyl coumarin of the formula:

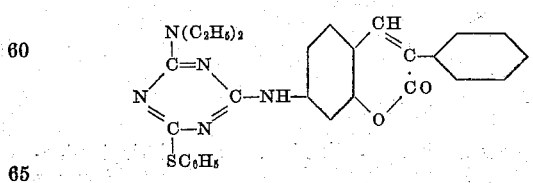

References Cited in the file of this patent

FOREIGN PATENTS

| | | |
|---|---|---|
| 518,213 | Canada | Nov. 8, 1955 |
| 723,288 | Great Britain | Feb. 2, 1955 |

OTHER REFERENCES

Landolt: American Dyestuff Reporter, pp. 353–356, April 18, 1949.

Goodwin: Arch. Biochem., vol. 27 (1950), pp. 152–173.